United States Patent Office 2,698,319
Patented Dec. 28, 1954

2,698,319

FURFURYL ALCOHOL POLYMER AND CONTINUOUS PROCESS FOR MAKING THE SAME

Lloyd H. Brown, Oak Park, and Preston A. Wells, Jr., Winnetka, Ill., assignors to The Quaker Oats Company, Chicago, Ill., a corporation of New Jersey No Drawing. Application July 21, 1953,
Serial No. 369,514

2 Claims. (Cl. 260—88.5)

The present invention relates to an improved process for the manufacture of polymers of furfuryl alcohol and continuous methods for its manufacture.

More particularly the present invention concerns itself with the continuous polymerization of furfuryl alcohol with the resultant formation of a viscous but still liquid polymer which lends itself to eventual further polymerization with the eventual production of an infusible and insoluble resin.

The new polymer produced in accordance with the present invention is characterized by its freedom from unpolymerized furfuryl alcohol, and also by having certain characteristics such as viscosity and index of refraction which enables it to be distinguished from other furfuryl alcohol polymers.

Furfuryl alcohol has been known for many years, being produced by the catalytic hydrogenation of furfural. Furfuryl alcohol is a rather labile material which is very readily polymerized by condensation with itself. This alcohol also can be polymerized by heating alone, but the polymerization is very greatly accelerated by the action of a number of catalysts, among which are metals, elements such as iodine, and particularly acids.

Hydrochloric acid, especially when concentrated, acts so violently that it is dangerous to use unless special precautions have been taken. However, it, as well as other mineral acids may be employed in the form of dilute solutions. Particularly effective for the purposes of the present invention are acids which are not volatile with steam and which preferably are selected from the group consisting of phosphoric acid, sulfuric acid, paratoluene sulfonic acid and boric acid.

The manufacture of polymer-free furfuryl alcohol resins by the use of catalysts of this type, including also the use of calcium chloride, ferric chloride, boron fluoride and the like, is described in the copending application of Lloyd H. Brown, Andrew P. Dunlop and Edward A. Reineck, Serial No. 344,238, filed March 23, 1953. In accordance with disclosures of the said application, furfuryl alcohol is heated with a dilute solution of phosphoric acid until a certain degree of polymerization has been effected, whereafter the catalyst is inactivated by suitable means and the resulting product is distilled for the recovery of unchanged, that is to say, unpolymerized, furfuryl alcohol, and, of course, water. However, by proceeding in this manner the yields are comparatively low, and therefore the process lacks certain elements of commercial applicability.

The present invention therefore can be considered as a direct improvement upon the disclosure of said copending application, in that it has now been found possible to convert substantially all of a given amount of furfuryl alcohol into a desired polymer by a continuous process. In this process the amount of conversion effected for each pass through the apparatus is comparatively small, say from 7.5 to 15% (average about 10%) but by reason of the fact that the furfuryl alcohol constantly recirculates through the conversion apparatus, the over-all effectiveness of the process is very greatly enhanced and the operation considerably simplified.

In essence, the process consists in first preparing a mixture of furfuryl alcohol with a suitable quantity of a catalyst, the passage of this mixture through a conversion apparatus so designed that the mixture will remain therein for a predetermined period of time at a predetermined optimum temperature, whereafter the effluent from the apparatus is neutralized or substantially neutralized by means of a suitable alkali, or other means are taken to inactivate the catalyst, whereafter the resulting mixture is distilled either at atmospheric pressure or under reduced pressure so as to recover the furfuryl alcohol, which is then recirculated, with the addition of an appropriate amount of catalyst, to the reaction vessel.

By reason of the constant return of the furfuryl alcohol to the reacting mass the effects of the exothermic nature of the reaction are minimized, thereby enabling far better control of the operating conditions than is possible in a batch operation.

While any acids which are not volatile with steam may be effectively employed, the present invention is illustrated, without thereby restricting the scope of the invention, to an operation in which phosphoric acid is used as the catalyst.

In view of the fact that furfuryl alcohol is completely miscible with water in all proportions and also that phosphoric acid is a very soluble acid, the mixture of phosphoric acid, water and furfuryl alcohol form a homogeneous system which can readily be handled by ordinary acid resistant apparatus.

Therefore, if a solution of furfuryl alcohol and phosphoric acid in water is passed into a reaction zone and the reaction initiated by heating, a fairly rapid conversion of the furfuryl alcohol to a polymer such as a dimer or trimer is effected.

If an attempt were made then to distill furfuryl alcohol from the mixture while the catalyst were still present this would lead to an undesired further polymerization and a possible formation of an insoluble resin, which is not desired. If, however, the solution be suitably controlled as to its acid content, that is to say, if its hydrogen-ion concentration be suitably reduced, say, to an equivalent of a pH of about 5 to 6, the mixture may be distilled without further polymerization and the polymer recovered in the desired state of purity. Of course there will be contained in it the residual material resulting from the inactivation of the catalyst, but for most purposes this is considered to be entirely unobjectionable.

The apparatus employed is so simple that it requires no illustration, consisting merely of a suitable vessel such as a tank which, if desired, can be enamel or glass lined, a storage tank for the mixture of catalyst and furfuryl alcohol, means for introducing this mixture into the reaction vessel, which may be effected either by gravity or by means of a suitable pump, any type of well known flowmeter being interposed to permit of the control of the operation as to the quantities of reactants admitted to the reaction vessel. The amount of material in the reaction vessel is kept substantially constant, an amount of reacted material being withdrawn to keep the level in the vessel at a predetermined point.

Inasmuch as the condensation or polymerization of furfuryl alcohol is accompanied by the evolution of water, the effluent will therefore contain more water than what has been charged into the apparatus as such. Preferably the apparatus is also provided with a suitable type of reflux condenser so that any vapor evolved during the polymerization reaction will be condensed and part of the resultant liquid returned to the reaction vessel.

The means adopted for the distillation of the resulting products may consist of an ordinary still provided with a condenser in which both the water and the furfuryl alcohol which is distilled away from the polymer may be condensed.

The following examples are given as a guide to proportions, temperature, indexes of refraction and viscosities of the materials which are involved in the present invention.

*Example 1*

A mixture of 1800 grams of distilled furfuryl alcohol mixed with 180 grams of a 2.2% phosphoric acid solution (2.5 grams of 85% phosphoric acid per 100 milliliters of solution) was made. 250 grams of this mixture were placed in a 500 millimeter three-necked glass flask and heated to 110° C. for 15 minutes. Further quantities of this prepared mixture were then fed into this flask at the rate of approximately 15 to 17 grams per minute and the temperature maintained, by heating, at about 110° to 125° C. The exothermic nature of the reaction thereafter maintains this material substantially within a range of about 114° C. to about 122° C. The reflux condenser attached to the flask was seen to return some liquid water to the reacting material. The operation was monitored by occasionally withdrawing a sample and measuring its refractive index. It was found that about a 15 minute residence time of the mixture within the reactor could yield an effluent having a refractive index of about 1.4783, which was found as a result of previous experimentation to be the optimum condition for the production of the desired product. About the same amount of material as was allowed to flow in the apparatus was withdrawn therefrom and this effluent was thereafter treated with a sufficient amount of an alkali, in this case an aqueous solution of sodium bicarbonate, until the effluent had a hydrogen-ion concentration of about pH 5.5, whereafter this mixture was distilled to remove the unchanged furfuryl alcohol and water. A yield, per pass, of polymer of about 11%, based upon the weight of the furfuryl alcohol, was obtained. This polymer had a viscosity of about 200 centipoises, and a refractive index of about 1.531. The furfuryl alcohol was continuously returned to the reaction vessel with the addition of 10% of its weight of 2.2% phosphoric acid as a catalyst. If instead of distilling at atmospheric pressure the distillation was effected under reduced pressure, for instance by the use of a suitable vacuum pump or aspirator on the receiver, the distillation could be effected at 12 millimeter pressure at about 110° C. and at 50 millimeter pressure up to about 140° C. The index of refraction of the polymer obtained under these conditions varied between 1.5308 and 1.5318 respectively.

The liquid polymer obtained was a dark brown liquid which could be cured to the infusible and insoluble condition by the addition of a catalyst such as phosphoric acid, sulfuric acid, or boric acid or their equivalents.

The polymers produced in accordance with the present invention are particularly useful in the formulation of coating compositions for acid-resistant apparatus and, particularly when mixed with inert acid-proof fillers, for the manufacture of dough-like mortars or cements such as are employed for the setting of acid-proof bricks.

The eventual resin produced from this furfuryl alcohol polymer is characterized by an extremely high resistance to almost any kind of acid or alkali, and for that reason the polymer, while it might be considered as an intermediate for resin production, is in itself a useful and merchantable commodity.

*Example II*

Instead of using phosphoric acid, an equivalent amount of sulfuric acid or boric acid or paratoluene sulfonic acid may be employed. It takes much less sulfuric acid than phosphoric acid by reason of the fact that sulfuric acid contains two active hydrogen atoms, that is to say, it is a dibasic acid, while phosphoric acid is a tribasic acid. It is one of the hydrogen atoms of the latter which is effective as a catalyst and will be productive of a sufficient degree of acidity properly to polymerize the furfuryl alcohol to the desired extent.

Thus it was found that the same hydrogen-ion concentration (pH 1.6—1.8) could be attained by using 10% of a sulfuric acid solution containing 0.65 gram of actual $H_2SO_4$ per liter as with a 2.2% solution of $H_3PO_4$.

The apparatus may be suitably heated in order to initiate the reaction and, usually by reason of the cooling effect of the constant addition of the furfuryl alcohol and solution of catalyst, requires some additional heating; by a proper coordination of the rate of feed and by suitably insulating the apparatus to minimize heat losses, the operation may be carried out without additional heat, but in any event the reaction is practically self-sustaining and very easily controlled.

The most desirable end product obtained has, as has been stated, a viscosity of about 200 centipoises and a refractive index of about 1.530, but other viscosities may be obtained by reacting to higher or lower refractive indexes.

Applicants claim:

1. A continuous process of producing a polymer of furfuryl alcohol which comprises passing a mixture of furfuryl alcohol and about one-tenth of the weight thereof of a dilute solution of phosphoric acid through a polymerization zone at a temperature of from about 110° C. to about 125° C. at such a rate that the mixture will remain at said temperature for about 15 minutes; neutralizing the effluent from said zone to about a hydrogen-ion concentration of pH 5.0 to pH 6, and distilling water and furfuryl alcohol therefrom, leaving the polymer as a liquid residue, and returning the furfuryl alcohol to the polymerization zone.

2. The process as defined in claim 1 in which the distillation is effected under an absolute pressure of from about 12 millimeters to about 50 millimeters (Hg column) and at a temperature of from about 110° C. to about 140° C.

References Cited in the file of this patent

UNITED STATES PATENTS

| Number | Name | Date |
|---|---|---|
| 2,420,330 | Shriver et al. | May 13, 1947 |
| 2,570,027 | Dunlop et al. | Oct. 2, 1951 |